(12) United States Patent
Ergonenc Yavas et al.

(10) Patent No.: US 12,603,440 B2
(45) Date of Patent: Apr. 14, 2026

(54) RADAR ABSORBING STRUCTURE

(71) Applicant: TUSAS—TURK HAVACILIK VE UZAY SANAYII ANONIM SIRKETI, Ankara (TR)

(72) Inventors: Zeynep Ergonenc Yavas, Ankara (TR); Yahya Oz, Ankara (TR); Duygu Cevher, Ankara (TR); Hasan Tore Silis, Ankara (TR)

(73) Assignee: TUSAS—TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 271 days.

(21) Appl. No.: 18/287,779

(22) PCT Filed: Apr. 26, 2022

(86) PCT No.: PCT/TR2022/050378
§ 371 (c)(1),
(2) Date: Oct. 20, 2023

(87) PCT Pub. No.: WO2022/235239
PCT Pub. Date: Nov. 10, 2022

(65) Prior Publication Data
US 2024/0186716 A1 Jun. 6, 2024

(30) Foreign Application Priority Data
May 4, 2021 (TR) ................................ 2021/007569

(51) Int. Cl.
*H01Q 17/00* (2006.01)
*B82Y 20/00* (2011.01)
(52) U.S. Cl.
CPC ........... *H01Q 17/005* (2013.01); *H01Q 17/00* (2013.01); *H01Q 17/008* (2013.01); *B82Y 20/00* (2013.01); *H01Q 17/002* (2013.01)

(58) Field of Classification Search
CPC .. H01Q 17/002; H01Q 17/005; H01Q 17/007; B82Y 20/00
(Continued)

(56) References Cited

U.S. PATENT DOCUMENTS 5,223,849 A * 6/1993 Kasevich ............... H01Q 17/00
343/895
5,661,484 A * 8/1997 Shumaker ............ H01Q 17/002
342/4
(Continued)

FOREIGN PATENT DOCUMENTS

CN 109334178 A * 2/2019 ............. B32B 37/10
CN 113782975 A * 12/2021 ............. H01Q 17/00
(Continued)

OTHER PUBLICATIONS

International Search Report and Written Opinion for PCT application No. PCT/TR2022/050378, mailed Sep. 29, 2022.
(Continued)

*Primary Examiner* — Chuong P Nguyen
(74) *Attorney, Agent, or Firm* — Notaro, Michalos & Zaccaria P.C.

(57) ABSTRACT

A radar absorbing structure has a body that forms an air and/or space vehicle. At least one aerodynamic surface is located on the body. At least one resistive layer is located on the at least one aerodynamic surface and allows substantial damping of electromagnetic waves on the at least one aerodynamic surface by means of the destructive interference. A plurality of fibers are located in the resistive layer. At least one binding agent holds the fibers together.

13 Claims, 3 Drawing Sheets

(58) Field of Classification Search
USPC ..................................................... 342/1, 2, 4
See application file for complete search history.

(56) References Cited

U.S. PATENT DOCUMENTS

| | | | | | |
|---|---|---|---|---|---|
| 6,043,769 | A | * | 3/2000 | Rowe ................... | H01Q 17/008 |
| | | | | | 428/113 |
| 6,350,513 | B1 | | 2/2002 | Melquist et al. | |
| 11,597,192 | B2 | * | 3/2023 | Pisu ....................... | B29C 70/882 |
| 11,924,963 | B2 | * | 3/2024 | Crouch ................. | H01Q 1/526 |
| 2007/0268173 | A1 | | 11/2007 | Randy | |
| 2014/0118177 | A1 | | 5/2014 | Appleton | |
| 2023/0228871 | A1 | * | 7/2023 | Oz ....................... | H01Q 17/008 |
| | | | | | 342/2 |
| 2024/0397685 | A1 | * | 11/2024 | Beeharry ............. | H05K 9/0088 |

FOREIGN PATENT DOCUMENTS

| | | | | | |
|---|---|---|---|---|---|
| CN | 118040332 | A | * | 5/2024 | ............. H01Q 17/00 |
| EP | 4161232 | A1 | * | 4/2023 | ........... H05K 9/0088 |
| KR | 102549250 | B1 | * | 6/2023 | ............... B32B 5/18 |
| RU | 2456722 | C1 | * | 7/2012 | ............. H01Q 17/00 |
| WO | WO-2025226206 | A1 | * | 10/2025 | ........... H01Q 17/005 |

OTHER PUBLICATIONS

International Preliminary Report on Patentability, completed on Jun. 16, 2023.
Demand/Request for Preliminary Examination dated Mar. 2, 2023.
Written Opinion of the International Preliminary Examining Authority dated Apr. 3, 2023, and response dated May 17, 2023.
Applicant May 17, 2023 Response to the Written Opinion of the International Preliminary Examining Authority.
International Application Status Report—retrieved Sep. 27, 2023.

* cited by examiner

701

601

702

G

703

P

RADAR ABSORBING STRUCTURE

FIELD

The present invention relates to a radar absorbing structure which allows the absorption of electromagnetic waves to which air and/or space vehicles are exposed.

BACKGROUND

Radar absorbing materials (RAM) are structures that reflect an incident electromagnetic wave within operating frequencies at the least possible rate, thereby converting a large part of the electromagnetic energy into heat and dampening it. The operation of the radar absorbing material is based on impedance matching or attenuation of an incident electromagnetic wave by utilizing the properties of magnetic and dielectric materials.

There are four basic techniques to reduce the radar signature. These techniques include conventional applications for radar absorbing materials, shaping, passive and active cancellation. Conventional applications for radar absorbing materials and shaping are widely used in the world. Passive and active cancellations are investigated especially for sixth generation fighter aircrafts.

US20130224023A1, which is included in the known-state of the art, discloses absorbing and shielding of electromagnetic waves. It discloses the advantage of a Salisbury screen-type radar absorber in terms of production and construction, as well as an electromagnetic wave absorber and a production method thereof, which exhibits a large damping bandwidth and has a thin support layer necessary for impedance matching. According to one embodiment of the electromagnetic wave absorber, the dielectric loss composite sheet comprises a polymer matrix containing a conductive powder dispersed in the sheet and exhibits complex permeability.

Thanks to a radar absorbing structure according to the present invention, the characteristics of a plurality of mechanisms providing electromagnetic protection in air and/or space vehicles can be formed within the same structure.

The patent application document US2007/268173A1 is related to a radar-absorbing honeycomb panel and methods of reducing the infrared and radar signature of a vehicle. The panel comprising: a first skin; a second skin; a honeycomb structure disposed between the first skin and the second skin and formed from an array of large cells; and wherein the honeycomb structure is adapted for attenuating an electromagnetic signature of the vehicle.

The patent application document US2014/118177A1 is related to radar absorbing materials (RAM). The wind turbine component preferably includes a lightning protection system, or at least part of a lightning protection system, for example one or more lightning receptors. The material is preferably highly conductive at frequencies of 1 GHz and above and acts as an electrical insulator at frequencies of 10 MHz and below.

The patent application document U.S. Pat. No. 6,350, 513B1 is related to a three dimensional structural articles made from low-density structural materials. The structural article is made from a structural foam core having a structural laminate outer skin and can be formed into most any shape or configuration.

The patent application document US2021/001610A1 is related to radar-absorbing broadband multilayer laminates made of composite material laminated to a polymeric matrix containing graphene nanoplatelets for use on an aircraft, wherein the multilayer radar-absorbing laminate comprises a plurality of juxtaposed blocks.

Another object of the invention is to provide active absorbing properties by means of the structure that incorporates different absorbing mechanisms.

SUMMARY

Another object of the invention is to create a radar absorbing mechanism operating in a more effective manner.

The radar absorbing structure realized to achieve the object of the invention, which is defined in claim 1 and other claims dependent thereon, comprises a body that forms the structure of an air and/or space vehicle; at least one aerodynamic surface located on the body; at least one resistive layer which is located on the aerodynamic surface and allows substantial damping of electromagnetic waves on the aerodynamic surface due to its destructive interference feature; a plurality of fibers provided in the structure of the resistive layer; and at least one binding agent that allows the fibers to hold together.

The radar absorbing structure according to the invention comprises at least one film located between the aerodynamic surface and the resistive layer and/or located on the aerodynamic surface to remain above the resistive layer, wherein the film is cured together with the aerodynamic surface and the resistive layer so as to provide impedance matching and destructive interference properties.

In an embodiment of the invention, the radar absorbing structure comprises a first film located on the resistive layer and containing fibers; a first binding agent allowing the fibers to be held together, which is obtained by mixing the binding agent with graphene in powder form and electroactive polymer, wherein the first binding agent is applied on the first film; the first film, which provides impedance matching and destructive interference properties thanks to the first binding agent applied on the first film.

In an embodiment of the invention, the radar absorbing structure comprises a plurality of second films which contain graphene and electroactive polymer and located on the aerodynamic surface between the aerodynamic surface and the resistive layer, wherein impedance value of the plurality of second films can be adjusted and controlled with predetermined graphene and electroactive polymer concentrations, wherein the plurality of second films are produced using the Interfacial Polymerization method.

In an embodiment of the invention, the radar absorbing structure comprises a third film which contains electroactive polymer and graphene material and located between the aerodynamic surface and the resistive layer so as to be closer to the resistive layer; at least one sensor located on the third film, which allows signal exchange.

In an embodiment of the invention, the radar absorbing structure comprises the third film, which can create vibration due to the change in the structural form of the electroactive polymer in its structure when exposed to electromagnetic waves, and thereby stimulating the sensor.

In an embodiment of the invention, the radar absorbing structure comprises at least one control unit to which the sensor transmits data; at least one transmitter located on the control unit and triggered by the command transmitted by the sensor so as to send a spoofing signal to the source that emits electromagnetic waves.

In an embodiment of the invention, the radar absorbing structure comprises the aerodynamic surface consisting of a conductive layer.

In an embodiment of the invention, the radar absorbing structure comprises the first film consisting of a resin-impregnated fabric.

In an embodiment of the invention, the radar absorbing structure comprises the resistive layer consisting of a resin-impregnated fabric.

In an embodiment of the invention, the radar absorbing structure comprises the aerodynamic surface consisting of a metal and/or a composite material.

In an embodiment of the invention, the radar absorbing structure comprises the fiber consisting of a fiberglass.

In an embodiment of the invention, the radar absorbing structure comprises the binding agent consisting of epoxy.

In an embodiment of the invention, the radar absorbing structure comprises the polymer (P) consisting of polyethylene and/or polyaniline and/or polyvinylidene fluoride and/or polyethyleneimine.

In an embodiment of the invention, the radar absorbing structure comprises graphene-based materials, which are nanosized and made of one or more of the graphene, graphene nano-powder, graphene oxide, reduced graphene oxide, functionalized graphene oxide, functionalized and reduced graphene oxide, metal graphene hybrid particle, graphene ribbon, carbon nanotube, or fullerene allotropes.

BRIEF DESCRIPTION OF THE DRAWINGS

The radar absorbing structure realized to achieve the object of the invention is illustrated in the attached drawings, in which.

DETAILED DESCRIPTION

Figure 1:
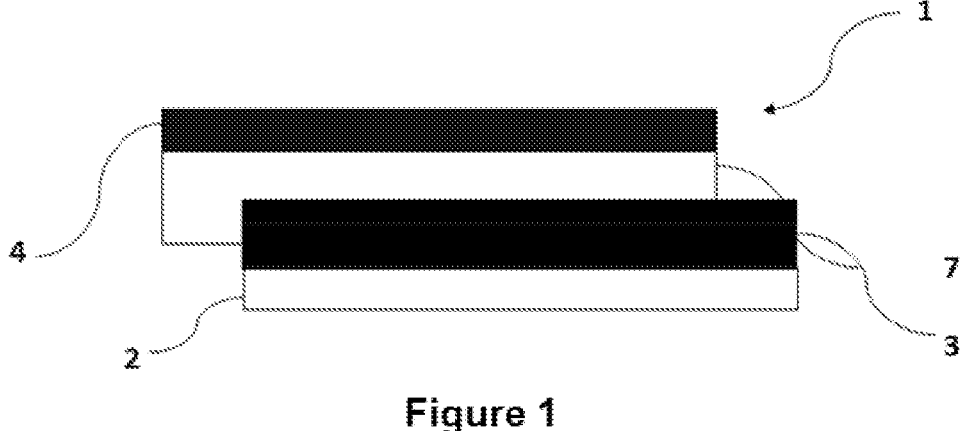
FIG. 1 is a schematic view of the Radar Absorbing structure.
Figure 2:
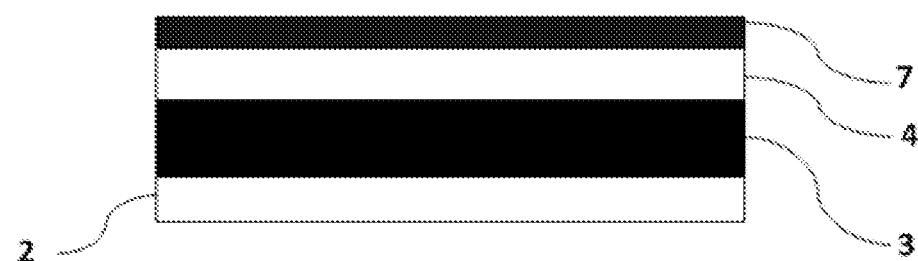
FIG. 2 is a schematic view of the Radar Absorbing structure.
Figure 3:
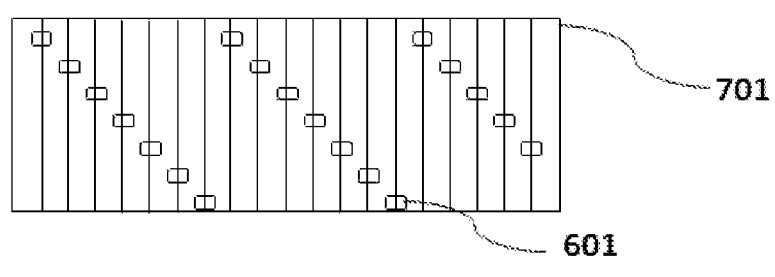
FIG. 3 is a schematic view of the first film and the first binding agent.
Figure 4:
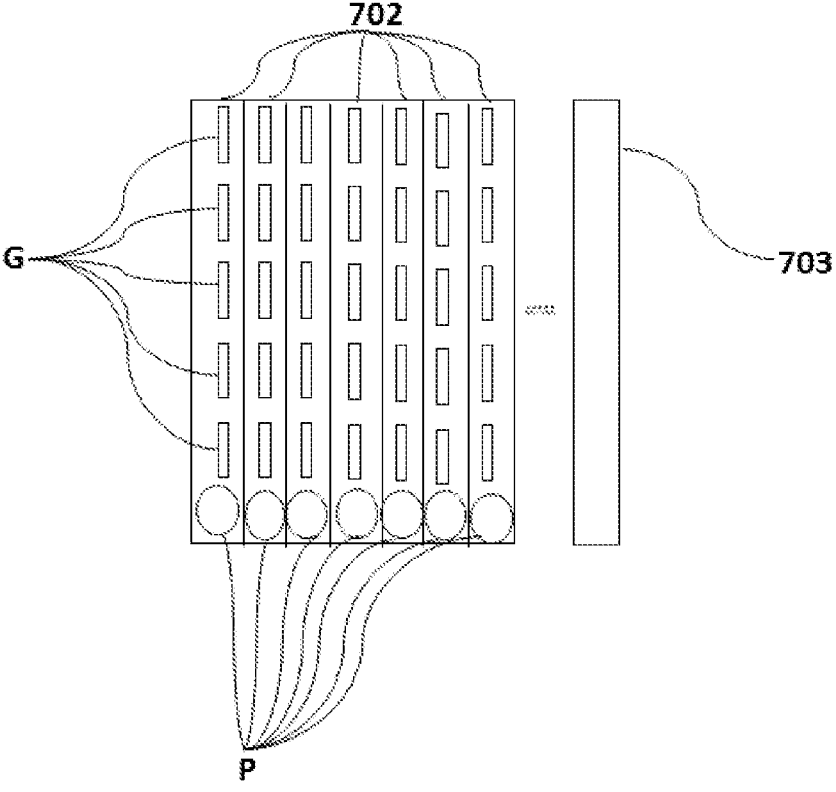
FIG. 4 is a schematic view of the graphene, polymer, second film and third film.
Figure 5:
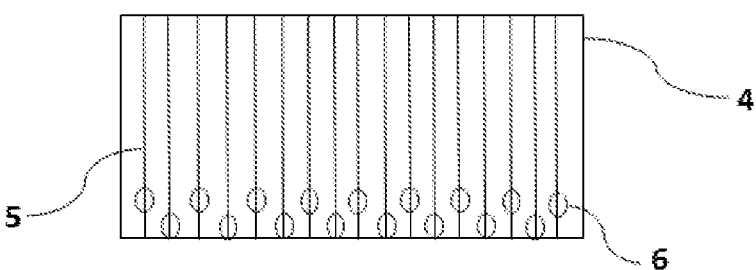
FIG. 5 is a schematic view of the resistive layer, fiber and binding agent.
Figure 6:
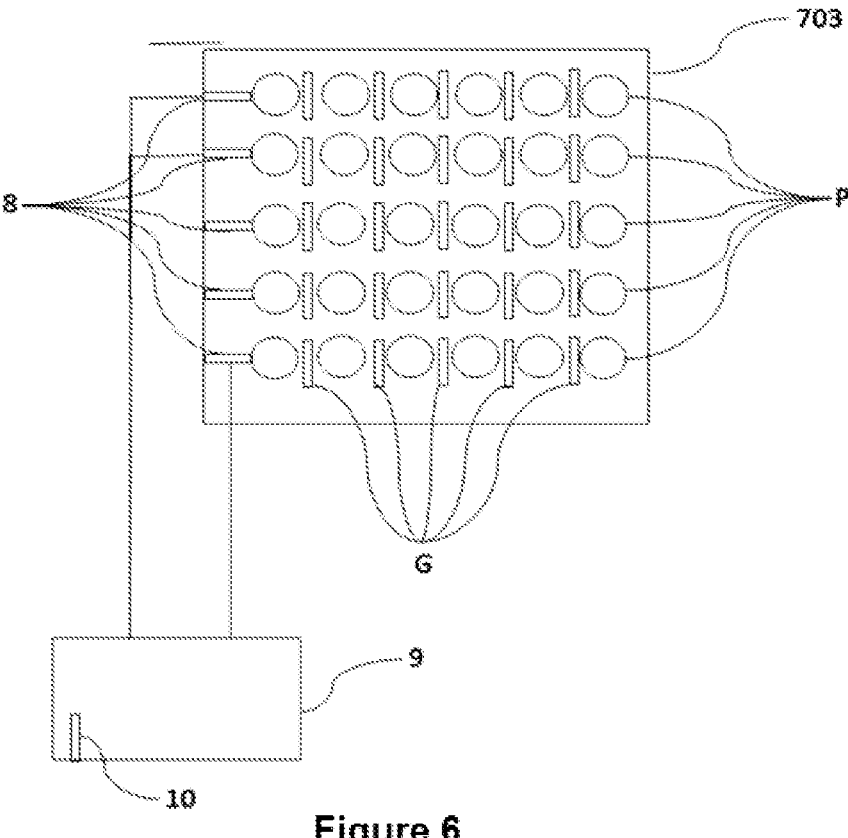
FIG. 6 is a schematic view of the graphene, polymer, third film, sensor, control unit and transmitter.

All the parts illustrated in figures are individually assigned a reference numeral and the corresponding terms of these numbers are listed below:

1. Radar Absorbing Structure
2. Body
3. Aerodynamic Surface
4. Resistive Layer
5. Fiber
6. Binding Agent
601. First Binding Agent
7. Film
701. First Film
702. Second Film
703. Third Film
8. Sensor
9. Control Unit
10. Transmitter The radar absorbing structure (1) comprises a body (2) that forms the air and/or space vehicle; at least one aerodynamic surface (3) located on the body (2); at least one resistive layer (4) which is located on the aerodynamic surface (3) and allows substantial damping of electromagnetic waves on the aerodynamic surface (3) by means of the destructive interference; a plurality of fibers (5) located in the resistive layer (4); and at least one binding agent (6) that holds the fibers (5) together.

The radar absorbing structure (1) according to the invention comprises at least one film (7) which is located between the aerodynamic surface (3) and the resistive layer (4) and/or on the aerodynamic surface (3) to remain above the resistive layer (4), wherein the film (7) is cured together with the aerodynamic surface (3) and the resistive layer (4) so as to provide impedance matching and destructive interference properties.

The radar absorbing structure (1) comprises a body (2) which forms an outer surface of an air vehicle, such as an airplane, and substantially surrounds the air vehicle; at least one aerodynamic surface (3) located on the body (2); at least one resistive layer (4) which is located on the aerodynamic surface (3) and provides substantial damping of electromagnetic waves on the aerodynamic surface (3) by means of the destructive interference characteristic of the Jaumann Absorber, which is a radar absorber, wherein the resistive layer (4) is provided in the structure of the Jaumann Absorber. In the structure of the resistant layer (4), there are provided a plurality of fibers (5) and at least one binding agent (6) allowing the fibers (5) to be held together in the structure.

In order to allow the impedance matching, which is a characteristic of the Salisbury Screen, and the destructive interference, which is the characteristic feature of the Jaumann Absorber, to be in the same structure, the radar absorbing structure (1) comprises at least one film (7) which is located between the aerodynamic surface (3) and the resistive layer (4) and cured together with the aerodynamic surface (3) and the resistive layer (4) and/or located on the resistive layer (4) on the aerodynamic surface (3) and cured together with the aerodynamic surface (3) and the resistive layer (4), thereby having a radar damping property. Radar absorbing structure (1) is created, which allows effective damping of electromagnetic radar waves thanks to the presence of both impedance matching and destructive interference in the structure consisting of the aerodynamic surface (3), the film (7) and the resistive layer (4), in case of exposure to electromagnetic waves.

In an embodiment of the invention, the radar absorbing structure (1) comprises a first film (701) located on the resistive layer (4) and containing fibers (5); a first binding agent (601) allowing the fibers (5) to be held together, which is obtained by mixing the binding agent (6) with graphene (G) in powder form and electro-active polymer (P), wherein the first binding agent (601) is applied on the first film (701), thus the first film (701) provides impedance matching and destructive interference properties. A first film (701) is provided on the aerodynamic surface (3), which is located on the resistive layer (4), contains fiber (5) in its structure and provides impedance matching property. A first binding agent (601) is formed by mixing the binding agent (6), graphene (G) in powder form, and the electroactive polymer (P). Thanks to the application of the first binding agent (601) on the first film (701), both impedance matching and destructive interference, which are radar damping structure properties, take place in the same structure and electromagnetic radar waves are damped more effectively.

In an embodiment of the invention, the radar absorbing structure (1) comprises a plurality of second films (702) which contain graphene (G) and electroactive polymer (P) in its structure and located on the aerodynamic surface (3) between the aerodynamic surface (3) and the resistive layer (4), wherein impedance value of the plurality of second films (702) can be controlled with graphene (G) and electroactive polymer (P) concentrations predetermined by the user, wherein the plurality of second films (702) are produced by the interfacial polymerization method. The second films (702) located between the aerodynamic surface (3) and the resistive layer (4) can be produced by the interfacial polymerization method using graphene (G) and electroactive polymers (P), and concentrations of graphene (G) and electroactive polymers (P) in its structure can be predetermined by the user, so that the impedance value can be controlled in the radar absorbing structure (1). Thanks to the second film (702) located in the radar absorbing structure (1) between the aerodynamic surface (3) and the resistive layer (4), impedance matching, which is a characteristic of the Salisbury Screen, and destructive interference, which is characteristic of the Jaumann Absorber, are provided in the same radar absorbing structure (1), and thus electromagnetic radar waves are damped more effectively.

In an embodiment of the invention, the radar absorbing structure (1) comprises a third film (703) which is made of electroactive polymer (P) and graphene (G) materials and located between the aerodynamic surface (3) and the resistive layer (4) so as to be closer to the resistive layer (4); at least one sensor (8) located on the third film (703) and providing signal exchange. On the plurality of second films (702) located between the aerodynamic surface (3) and the resistive layer (4), a third film (703) made of electroactive polymer (P) and graphene (G) is located closer to the resistive layer (4) so as to be first exposed to the electromagnetic field coming from the outside. On the third film (703), at least one sensor (8) of micro or nano size is provided, which allows signals to be sent and received.

In an embodiment of the invention, the radar absorbing structure (1) comprises the third film (703) which creates vibration due to the change in the form of the electro-active polymer (P) with the effect of electromagnetic waves, thus allowing the excitation of the sensor (8). Electroactive polymer (P) structures in the structure of the third film (703) create micro vibrations when exposed to electromagnetic waves. As a result of the formation of micro vibrations, form of the third film (703) changes, which is perceived by the sensor (8).

In an embodiment of the invention, the radar absorbing structure (1) comprises at least one control unit (9) to which the sensor (8) transmits data; at least one transmitter (10) located on the control unit (9) and triggered by the command received from the sensor (8) so as to send a spoofing signal to the electromagnetic wave source. The sensors (8) that detect the changes in the form of the third film (703) transmit these data to the control unit (9). The control unit (9), to which the sensor (8) transmits data in response to the electromagnetic wave, triggers the transmitter (10) provided thereon, so that a spoofing signal is sent to the electromagnetic wave source after damping.

In an embodiment of the invention, the radar absorbing structure (1) comprises the aerodynamic surface (3) which is a conductive layer. The aerodynamic surface (3) is located on the body (2) and substantially forms the outermost surface of the air and/or space vehicle, which is in contact with the air.

In an embodiment of the invention, the radar absorbing structure (1) comprises the first film (701) which is a resin-impregnated fabric. The first film (701) consists of a resin-impregnated fabric (prepreg) which contains fiber (5) and on which the first binding agent (601) containing a mixture of the binding agent (6), graphene (G) in powder form and electro-active polymer (P) is applied.

In an embodiment of the invention, the radar absorbing structure (1) comprises the resistive layer (4) which is a resin-impregnated fabric. The resistant layer (4), which is a resin-impregnated fabric, contains fibers (5) and a binding agent (6) is applied on the fibers (5).

In an embodiment of the invention, the radar absorbing structure (1) comprises the aerodynamic surface (3) which is a metal and/or a composite material. Therefore, conductivity is provided to the aerodynamic surface (3) with a conductive metal and/or a conductive composite material.

In an embodiment of the invention, the radar absorbing structure (1) comprises the fiber (5) which is a fiberglass. Therefore, the fibers (5) are effectively used in the radar absorbing structure (1).

In an embodiment of the invention, the radar absorbing structure (1) comprises the binding agent (6) which is epoxy.

In an embodiment of the invention, the radar absorbing structure (1) comprises the polymer (P) which is polyethylene and/or polyaniline and/or polyvinylidene fluoride and/or polyethyleneimine. Therefore, electroactive polymers are used in the first film (701), the second film (702) and the third film (703).

In an embodiment of the invention, the radar absorbing structure (1) comprises the graphene (G), which is nano-sized, wherein the graphene (G) is one or more of the graphene, graphene nano-powder, graphene oxide, reduced graphene oxide, functionalized graphene oxide, functionalized and reduced graphene oxide, metal graphene hybrid particle, graphene ribbon, carbon nanotube, or fullerene allotropes. Therefore, the radar absorbing structure (1) has destructive interference and impedance matching characteristics.

The invention claimed is:

1. A radar absorbing structure (1) comprising:
   a body (2) that forms the air and/or space vehicle;
   at least one aerodynamic surface (3) located on the body (2);
   at least one resistive layer (4) which is located on the at least one aerodynamic surface (3) and allows substantial damping of electromagnetic waves on the at least one aerodynamic surface (3) by means of the destructive interference;
   a plurality of fibers (5) located in the at least one resistive layer (4);
   at least one binding agent (6) that holds the plurality of fibers (5) together;
   at least one film (7) which is located between the at least one aerodynamic surface (3) and the at least one resistive layer (4) and/or on the at least one aerodynamic surface (3) to remain above the at least one resistive layer (4), wherein the at least one film (7) is cured together with the at least one aerodynamic surface (3) and the at least one resistive layer (4) to form a cured composite layer formed by the aerodynamic surface, the film, and the resistive layer, which together provide impedance matching and destructive interference;
   a first film (701) located on the at least one resistive layer (4) and containing the plurality of fibers (5); and
   a first binding agent (601) allowing the plurality of fibers (5) to be held together, which is obtained by mixing the binding agent (6) with graphene (G) in powder form and electro-active polymer (P), wherein the first binding agent (601) is applied on the first film (701) to form, together with the plurality of fibers (5), a resistive composite layer that contributes to the impedance-matching and destructive-interference performance of the radar absorbing structure (1).

2. The radar absorbing structure (1) according to claim 1, comprising a plurality of second films (702) which contain graphene (G) and electroactive polymer (P) in its structure and located on the at least one aerodynamic surface (3) between the at least one aerodynamic surface (3) and the at least one resistive layer (4), wherein impedance value of the plurality of second films (702) can be controlled with graphene (G) and electroactive polymer (P) concentrations predetermined by the user, wherein the plurality of second films (702) are produced by the interfacial polymerization method.

3. The radar absorbing structure (1) according to claim 2, comprising:

a third film (703) which is made of electroactive polymer (P) and graphene (G) materials and located between the at least one aerodynamic surface (3) and the at least one resistive layer (4) so as to be closer to the at least one resistive layer (4); and at least one sensor (8) located on the third film (703) and providing signal exchange.

4. The radar absorbing structure (1) according to claim 3, wherein the third film (703) creates vibration due to the change in the form of the electro-active polymer (P) with the effect of electromagnetic waves, thus allowing the excitation of the sensor (8).

5. The radar absorbing structure (1) according to claim 3, comprising:

at least one control unit (9) to which the sensor (8) transmits data; and at least one transmitter (10) located on the control unit (9) and triggered by the command received from the sensor (8) so as to send a spoofing signal to the electromagnetic wave source.

6. The radar absorbing structure (1) according to claim 1, wherein the at least one aerodynamic surface (3) is a conductive layer.

7. The radar absorbing structure (1) according to claim 1, wherein the first film (701) is a resin-impregnated fabric.

8. The radar absorbing structure (1) according to claim 1, wherein the at least one resistive layer (4) is a resin-impregnated fabric.

9. The radar absorbing structure (1) according to claim 1, wherein the at least one aerodynamic surface (3) is a metal and/or a composite material.

10. The radar absorbing structure (1) according to claim 1, wherein the plurality of fibers (5) are a fiberglass.

11. A radar absorbing structure (1) according to claim 1, wherein the at least one binding agent (6) is epoxy.

12. The radar absorbing structure (1) according to claim 1, wherein the polymer (P) is polyethylene and/or polyaniline and/or polyvinylidene fluoride and/or polyethyleneimine.

13. The radar absorbing structure (1) according to claim 1, wherein the graphene-based materials (G) are nanosized, wherein the graphene-based materials (G) are one or more of graphene, graphene powder, graphene oxide, reduced graphene oxide, functionalized graphene oxide, functionalized and reduced graphene oxide, metal graphene hybrid particle, graphene ribbon, carbon nanotube, or fullerene allotropes.

* * * * *